(12) United States Patent
Harambillet (10) Patent No.: US 12,260,082 B2
(45) Date of Patent: Mar. 25, 2025

(54) METHOD FOR STORING DATA IN A DATA STORAGE SPACE OF A SERVER, ASSOCIATED STORAGE ADMINISTRATION DEVICE AND SERVER COMPRISING SUCH A DEVICE

(71) Applicant: THALES, Courbevoie (FR)

(72) Inventor: Pierre Harambillet, Merignac (FR)

(73) Assignee: THALES, Courbevoie (FR)

( * ) Notice: Subject to any disclaimer, the term of this patent is extended or adjusted under 35 U.S.C. 154(b) by 47 days.

(21) Appl. No.: 17/764,044

(22) PCT Filed: Sep. 25, 2020

(86) PCT No.: PCT/EP2020/076846
§ 371 (c)(1),
(2) Date: Mar. 25, 2022

(87) PCT Pub. No.: WO2021/058717
PCT Pub. Date: Apr. 1, 2021

(65) Prior Publication Data
US 2022/0317880 A1  Oct. 6, 2022

(30) Foreign Application Priority Data

Sep. 27, 2019 (FR) ................... FR 19 10684

(51) Int. Cl.
*G06F 3/06* (2006.01)

(52) U.S. Cl.
CPC .......... *G06F 3/0604* (2013.01); *G06F 3/0608* (2013.01); *G06F 3/0644* (2013.01); *G06F 3/067* (2013.01)

(58) Field of Classification Search
None
See application file for complete search history.

(56) References Cited

U.S. PATENT DOCUMENTS

| 5,559,764 A * | 9/1996 | Chen ............... G06F 3/0613 386/265 |
| 2014/0164329 A1* | 6/2014 | Guo ............... G06F 16/951 707/634 |

(Continued)

FOREIGN PATENT DOCUMENTS

EP          0697660 A1    2/1996

OTHER PUBLICATIONS

International Search Report issued by the International Searching Authority in corresponding International Application No. PCT/EP2020/076846, mailed Jan. 11, 2021.

*Primary Examiner* — Tracy C Chan
(74) *Attorney, Agent, or Firm* — ArentFox Schiff LLP (57) ABSTRACT

A method of storing data in a memory of a server, comprising the following steps:
  partitioning the memory into separate partitions;
  receiving content and storing said content in one of said partitions;
  a number, called the number of replications, is associated with each partition; distinct numbers of replications being associated with distinct partitions;
  a number of replications n of said received content having been defined for said content, selecting a partition with which said defined number n of replications has been associated, storing said content comprising the storing of n replications of said content in said selected partition.

10 Claims, 5 Drawing Sheets

(56) References Cited

U.S. PATENT DOCUMENTS

2017/0160959 A1\* 6/2017 Wang .................... G06F 9/5016
2018/0091586 A1\* 3/2018 Auradkar ............ H04L 67/1004
2018/0192078 A1\* 7/2018 Margis ................ G06F 3/04842

\* cited by examiner

METHOD FOR STORING DATA IN A DATA STORAGE SPACE OF A SERVER, ASSOCIATED STORAGE ADMINISTRATION DEVICE AND SERVER COMPRISING SUCH A DEVICE

CROSS-REFERENCE TO RELATED APPLICATIONS

The present Application for Patent is a National Stage Entry of International Application No. PCT/EP2020/076846, filed Sep. 25, 2020, which claims priority to French Patent Application No. 19 10684, filed Sep. 27, 2019. The disclosures of the priority applications are incorporated in their entirety by reference herein.

BACKGROUND OF THE TECHNOLOGY

The present invention relates to storage in a server's data storage space.

Such a server is, for example, a media server of an in-vehicle entertainment system comprising entertainment user terminals for a passenger transport vehicle, said media server being carried on board said mobile vehicle and connected to in-vehicle entertainment user terminals via an in-vehicle local area network.

Such mobile entertainment systems can be found in aircraft, mainly on long-haul commercial aircraft, and are also known as In-Flight Entertainment (IFE) systems.

The entertainment terminals are usually connected via a wired or wireless network to the on-board media server which is also part of the IFE system.

Thus, in order to be accessible to the entertainment terminals, the computer content is first loaded onto the on-board media server.

Volumes of media content, for instance volumes of content offered on board a vehicle, are growing, and with increasing resolutions (2K, 4K, 8K, etc.) and quality video standards (HDR, HDR10, HDR10+, Dolby Vision), the volume of storage required will continue to grow.

In addition, each item of media content is often stored several times in the storage space to compensate for hardware failures.

There is therefore a need to manage the storage space of a server in which multiple copies of data sets must be stored.

BRIEF SUMMARY

To this end, according to a first aspect, the invention proposes a method of storing data in a data storage space of a server, comprising the following steps implemented by an electronic storage space management module:
partitioning the storage space into a plurality of distinct partitions;
receiving a set of data to be stored and storing said set of data in one of said partitions;
said method being characterised in that it further comprises the following steps: partitioning the storage space into a plurality of distinct partitions;
receiving a set of data to be stored and storing said set of data in one of said partitions;
said method being characterised in that it further comprises the following steps:
a number, called the number of replications, is associated with each partition; distinct partition numbers being associated with distinct partitions;
a number of replications n of said received data set having been defined for said data set, selecting a partition with which said defined number n of replications has been associated, storing said data set comprising the storing of n replications of said data set in said selected partition.

The invention thus provides a solution to facilitate the storage of data sets, some of which are to be stored in multiple copies. The useful storage volume is thus optimised. The ratio between useful volume and gross storage volume is optimised, while maintaining the best possible compromise of resilience versus performance. The time required to implement the storage of content or to update it, for example following a change in the number of replications to be stored, is reduced.

In embodiments, the method of storing data in a data storage space according to the invention further comprises one or more of the following features:
the storage space is distributed over a plurality of electronic storage units and if the number n of replications of said received set is greater than 2, the storage of said data set is implemented by the electronic storage space management module under the following condition: Distinct replications of said data set are stored, in said selected partition, on distinct units, said units being cards or disks of the same card;
the partitioning is updated, including changing the sizes of the partitions assigned to numbers of replications, according to the data sets to be stored;
said server is a media server for an on-board entertainment system comprising entertainment user terminals for a passenger transport vehicle, said media server being intended to be carried on board said vehicle and to be connected to at least one on-board entertainment user terminal via an on-board local area network, the media server comprising:
said storage space, the data sets comprising media content;
a distribution module configured to distribute, via the on-board local area network, to at least one user terminal at least one item of media content stored in the storage space;
the method comprises the following steps implemented by the electronic storage space management module to free up space in a partition associated with a number of replications:
a. calculating the current value of a preservation parameter for each of a plurality of data sets for which the same first number of replications has been defined, equal to said number of replications associated with said partition; said parameter representing a time divided by a number of accesses to said content during said time;
b. selecting at least one data set to be deleted from said partition based on a comparison of said current values with each other;
step b further comprises a step of updating the number of replications defined for said data set to be deleted, said updated number being set as equal to a number of replications associated with one of said partitions and strictly lower than said first number;
steps a and b are implemented successively for each of the partitions, starting with the partition associated with the largest number of replications and continuing in descending order of said numbers of replications associated with the partitions.

In a second aspect, the present invention provides a device for managing a data storage space, said device being adapted to partition the storage space into a plurality of distinct partitions, to receive a data set to be stored, and to store said data set in one of said partitions;

said device being characterised in that it is adapted to associate a number, called the number of replications, with each partition, distinct partition numbers being associated with distinct partitions;

said device being adapted to, a number of replications n of said received data set having been defined for said data set, select a partition with which said defined number n of replications has been associated, and to store n replications of said data set in said selected partition.

In a third aspect, the present invention provides a server comprising a data storage space and a device for managing said data storage space according to the second aspect of the invention.

BRIEF DESCRIPTION OF THE DRAWINGS

These characteristics and advantages of the invention will become apparent upon reading the following description, given only as a nonlimiting example, referring to the attached drawings, in which.

DETAILED DESCRIPTION

Figure 1:
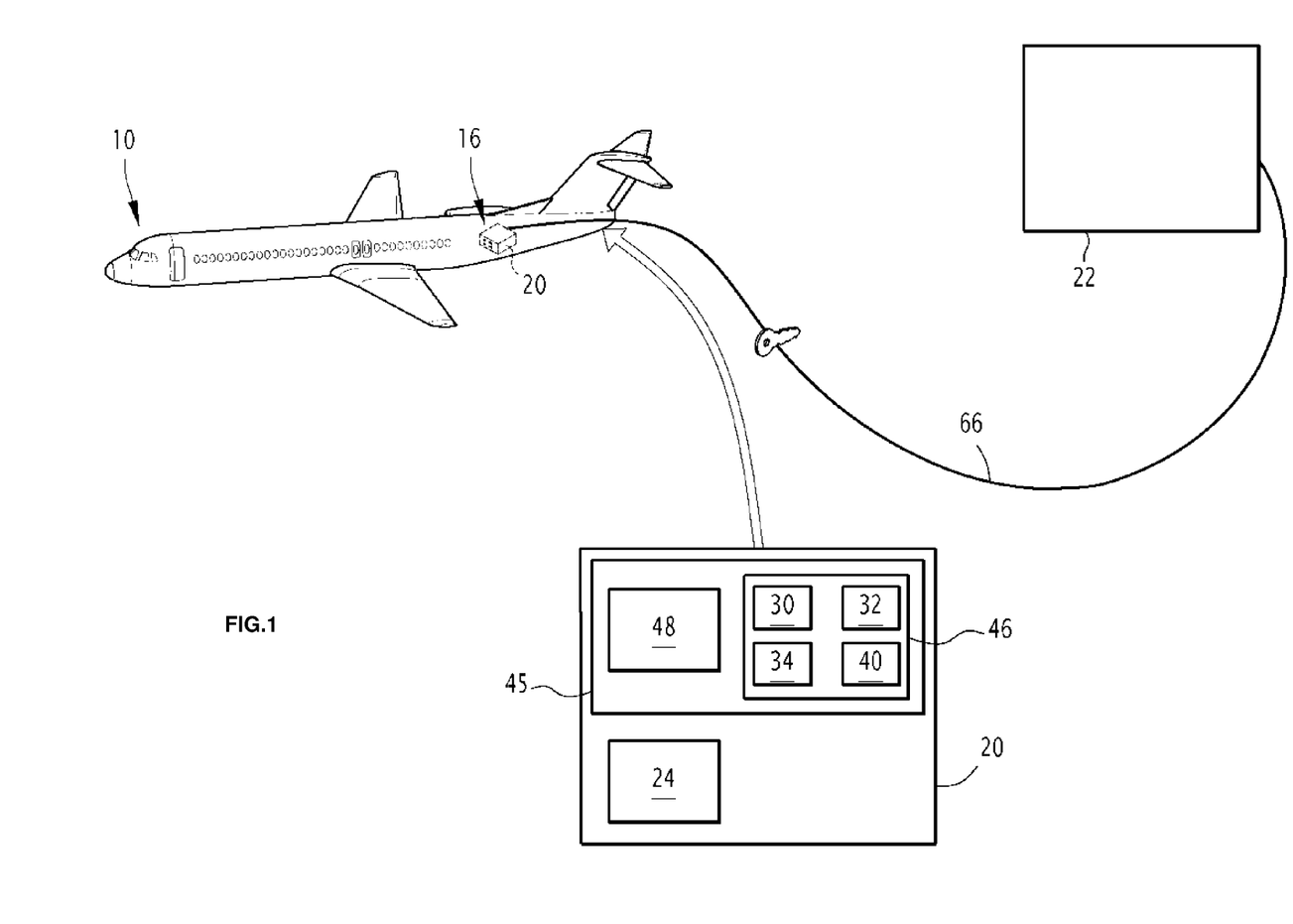
FIG. 1 is a schematic view of an aircraft equipped with an electronic entertainment system comprising entertainment terminals, not shown, and a media server in one embodiment of the invention.

In FIG. 1, an aircraft 10 is shown in one embodiment of the invention: the aircraft 10 is equipped with an electronic entertainment system 16 comprising entertainment user terminals, not shown, and a media server 20.

The aircraft 10 is preferably an aircraft, in particular a commercial aircraft, such as a long-haul aircraft. The aircraft 10 is capable of carrying passengers, particularly a few dozen or even a few hundred passengers. It should be noted that in other embodiments, the aircraft is replaced by a passenger transport vehicle of another type, such as a truck, bus, ship etc.

The entertainment system 16 on board the aircraft 10 is configured to broadcast media content to the passengers of the aircraft 10, in particular during the flight (e.g. movies, TV programmes, games, or music), and/or information on the course of the flight (altitude, speed, current position, distance traveled, etc.).

As an optional extra, the entertainment system 16 is configured to broadcast practical information about, for example, the arrival airport, for example via announcements in audio and/or video form.

Each entertainment terminal is known per se, and is connected to the media server 16 via a local area network, not shown, on board the aircraft 10.

Each entertainment terminal is, for example, attached to or integrated into the passenger's own seat, or is attached to or integrated into the seat back in front of the passenger's seat. The seats are typically arranged in rows within the aircraft 10.

Each entertainment terminal, also known as a user terminal, comprises a human-machine interface (HMI), a processing module, an application module and a telecommunications module. The HMI includes, for example, a touch screen, or a screen and keyboard. The application module comprises one or more application blocks. The telecommunication module comprises a control block and one or more telecommunication interfaces adapted to transmit and receive data. The processing module is adapted to control and coordinate the operation of the application module, the HMI and the telecommunication module. In one embodiment, it comprises a processor and a memory, for example a hard drive or any other storage space capable of storing computer content received in particular via the telecommunications module.

Each entertainment terminal is adapted to deliver to passengers the computerised media content offered by the in-flight entertainment system. For example, following a passenger's selection of a field displayed on the HMI screen of their entertainment terminal, the processing module is adapted to identify that a selection menu of one of the applications, for example a list of movies, should then be displayed. Then, upon detection of a film selection by the passenger, the processing module is adapted to trigger the display of the movie on the screen. In addition to films, the content delivered by the applications can be diverse: media content, e.g. movies, TV programmes, games or music, flight parameters (altitude, speed, etc.) and progress (e.g. using a "moving map"), and announcements (audio and/or video) by the crew. The display is capable of displaying images corresponding to computer content distributed from the media server 20. More precisely, the computer content is received via the telecommunication module from the media server 20 in the form of a stream or stored in the memory of the terminal, after having been previously downloaded from the media server 20 via the said telecommunication module.

Once a passenger has ordered the media content to be played via the entertainment terminal's HMI, the passenger can then access it, with the media content being played (via audio and/or video) on the HMI of their user terminal. The user can thus have access to it for the entire duration of the content, or only a part of this duration if they stop earlier or if they only view some excerpts of it.

The media server 20 is connected to at least one entertainment terminal, preferably to each entertainment terminal, via an on-board local area network.

When the on-board local area network is partially wired and partially wireless, the media server 20 is for example wired to an entertainment terminal in each row of seats, and said terminal wired to the media server 20 is then connected via wireless links to the other terminals in the row of seats.

Each wireless link is, for example, a radio link, such as a link complying with at least one version of the IEEE 802.11 standard, also known as the Wi-Fi™ standard, or a link complying with the Li-Fi standard, for example the IEEE 802.15.7 standard.

The media server 20 can be connected to an external electronic content delivery device 22 via a communication link 66, for example encrypted. In one embodiment, this connection is only implemented when the aircraft 10, on which the server is carried, is on the ground, parked at the airport, as shown in FIG. 1 (the link 66 may be wired or wireless). In another embodiment, this connection is satellite-based and can take place even in flight.

The media server 20 comprises a data storage space 24, an electronic storage control module 30, an electronic module 32 for interfacing with the data storage space, an electronic partitioning module 34, and an electronic distribution module 40.

In the example shown in FIG. 1, the media server 20 comprises an information processing unit 45 formed for example by a memory 46 and a processor 48 associated with the memory 46.

In the example of FIG. 1, the storage control module 30, the interface module 32, the partitioning module 34, and the distribution module 40, are each in the form of software which can be executed by the processor 48. The memory 46 of the media server 20 is then able to store storage control software, interface software and distribution software. The processor 48 in this case is able to execute each of the software programs.

In a variant not shown, the storage control module 30, the interface module 32, the partitioning module 34, and the distribution module 40 are each in the form of a programmable logical component, such as a FPGA (Field Programmable Gate Array), or as a dedicated integrated circuit, such as an ASIC (Application-Specific Integrated Circuit).

When the media server 20 is in the form of one or more pieces of software, that is to say in the form of a computer program, it is also capable of being stored on a computer-readable medium, not shown. The computer-readable medium is, for example, a medium that can store electronic instructions and be coupled with a bus from a computer system. For example, the readable medium is an optical disk, magneto-optical disk, ROM memory, RAM memory, any type of non-volatile memory (for example EPROM, EEPROM, FLASH, NVRAM), magnetic card or optical card. The readable medium in such a case stores a computer program comprising software instructions.

The data storage space 24 is adapted to store media content supplied to it by the external equipment 22 for subsequent supply to the entertainment terminals by the server 20.

Figure 2:
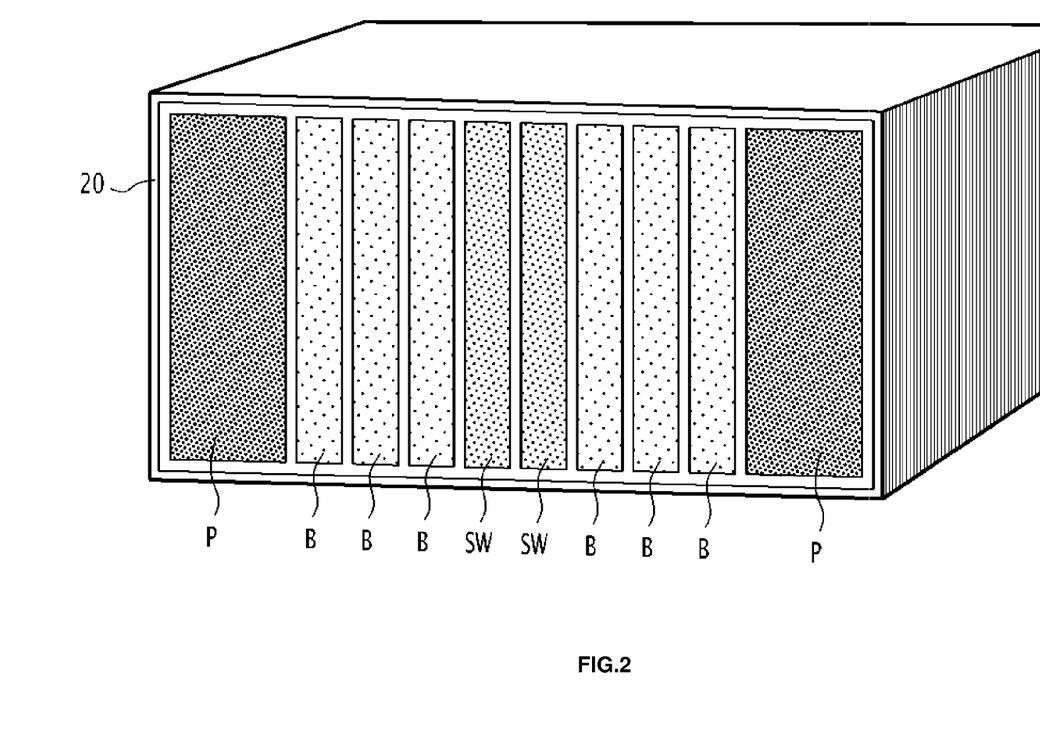
FIG. 2 is a schematic of an electronic cabinet forming the media server of FIG. 1.

In one embodiment, with reference to FIG. 2, the media server 20 is implemented as an electronic cabinet comprising one or more power supply cards P, one or more network switch cards SW, and one or more electronic storage cards B. Each of these cards is connected to a backplane (not shown).

A power supply card P is configured to convert electrical power received from an on-board power supply network into other electrical power supplied to the electronic cards SW and B.

A network switch card SW is a card dedicated to communications with the on-board local area network on the one hand, and with the external electronic equipment 22 via the link 66 on the other. The network switch card SW is also able to perform data routing between the aforementioned networks on the one hand and the data storage cards B on the other hand, i.e. to implement a network switching functionality, such as Ethernet switching.

A data storage card B is a card configured to store data, including computerised media content for distribution to entertainment terminals. The data storage card B typically comprises at least one mass storage memory. In one embodiment, at least some of these data storage cards B further comprise one or more CPUs, such as one or more processors, and are further configured for computing, for example to perform processing that requires quite large calculation resources and that is performed in particular on data stored in the storage space 24.

Beyond this hardware layer comprising the mass storage memory and the CPU, the data storage card B comprises software layers allowing the server 20 to implement file management and orchestration of functions implemented by the server 20.

Each data storage card B comprises a number $N_{d/b}$ separate hardware storage units, e.g. storage drives, e.g. SSDs. In this example, $N_{d/b}$ is at least 2 and at most 4. For example, each SSD drive has a data storage capacity of 8 TB (Terabyte) each. Each data storage card B thus offers between 16 and 32 TB of storage capacity.

In the embodiment under consideration, the server 20 comprises a number Nb of data storage cards B, with for example Nb equal to at least 3 and at most 6. In this case, all the storage capacities offer an available volume between 16×3 and 32×6, i.e. between 48 and 196 TB.

All the storage capacities of the data storage cards B are aggregated within the server 20, thanks in particular to the functions of the network switch cards SW, in a logical way into one and the same file system called a "distributed file system", constituting the data storage space 24.

According to the invention, N is equal to the number of distinct replication rate values considered, N being chosen to be greater than or equal to 2; an item of media content can thus be copied n times in the storage space 24 with n∈ $\{n_1, n_2, \ldots, n_N\}$, where $n_i$, i=1 to N is an integer.

For example, in a particular case under consideration, it is considered that an item of media content stored in the storage space 24 can be stored in one copy (replication rate TR equal to 1), in two copies (replication rate TR equal to 2) or in three copies (replication rate TR equal to 3): N is then equal to 3.

The replication rate defined for an item of media content can be determined in several ways, as will be described later.

Note that in another embodiment, non-consecutive replication rates will also give a value of N equal to 3 with (TR equal to e.g. 1, 2 and 4).

The partitioning module 34 is configured to perform a partitioning operation on the storage space 24 into N partitions ESP1, ESP2, . . . ESPN, and to associate with each partition ESPi the replication rate TR equal to $n_i$, i=1 to N.

In one embodiment, all N rates are distinct and only one replication rate is associated with any partition.

According to the invention, the media contents to be stored in the storage space 24 with a replication rate TR equal to $n_i$, i.e. in $n_i$ copies, will thus be copied $n_i$ times in the ESPi partition, as described below.

In a known way, partitioning a storage space is the operation of dividing it into partitions, or regions, in which the operating system of the server 20 can manage their information separately and privately. There are different tools (fdisk, diskpart, disk.app etc.) to perform and manipulate partitioning for different architectures, including MBR, GPT etc.

In one embodiment, the maximum replication rate RL is set equal to the number of disks physically present, i.e. Nb×$N_{d/b}$. Such a high replication rate is obviously at the expense of useful storage space.

The maximum replication rate for resilience to card loss is Nb.

The replication rate to maximise useful storage space is 1.

The local area network on board the aircraft 10 is a wired-only network, or a partially wired and partially wireless network, or a wireless-only network.

The storage control module 30 is configured to control the storage of the media content in the data storage space 24, in particular to determine, in the data storage space 24, which media content to delete and/or which content to be retained and/or the number of replications TR to be stored for each item of content to be retained or saved in the storage space 24.

The storage control module 30 is further configured to provide to the interface module 32, for each item of media content, a delete command if the content is to be deleted, or, if the media content is to be retained, to provide the value of the replication rate TR associated with it from among $n_1$, $n_2$, ..., $n_N$.

The interface module 32 is adapted to interface with the storage space 24 to implement commands received from the storage control module 30, i.e. to delete media content or to store one or more copies of new or already-stored media content in the storage space, depending on the replication rates determined for the respective content.

The interface module 32 is, according to the invention, adapted to choose the location in the storage space according to the replication rate $n_i$ defined for each item of media content: the interface module 32 is thus adapted to select whichever one of the partitions in the storage space 24 is associated with a replication rate equal to $n_i$, i.e. the partition ESPi, and to store said content in $n_i$ copies in that selected partition ESPi.

Furthermore, in one embodiment, the interface module 32 is adapted to meet the following constraints:
only one item of media content must be stored in a single SSD, for content with a replication rate of 1;
as soon as the replication rate $n_i$ is greater than or equal to 2, copies of the same content must be stored in separate cards.

The distribution module 40 is configured to distribute the corresponding media content to each entertainment terminal. For example, the distribution module 40 is configured to stream the corresponding media content to each entertainment terminal (in case of multiple replications of the content present in the storage space 24, the interface module 32 is configured to select whichever one of the replications is used). In this case, the user of the entertainment terminal can access the content as it is streamed.

Figure 4:
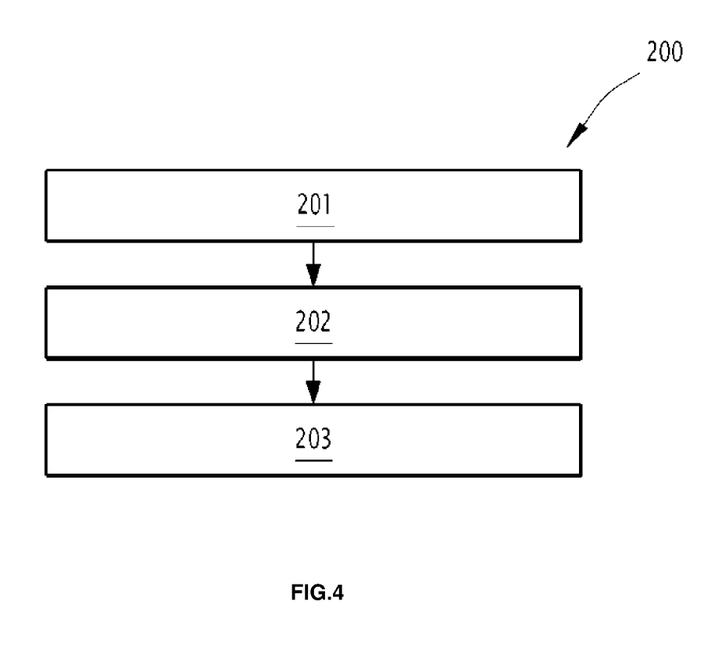
FIG. 4 is a flowchart of steps implemented in one embodiment of the invention.

Operations implemented by the media server 20 will now be explained, in particular with the aid of FIG. 4 showing a flowchart 200 of a method for storing data in the server's data storage space, in one embodiment of the invention, the method being implemented by the media server 20.

In a step 201, a number N equal to the number of distinct replication rate values considered having been set, the partitioning module 34 partitions the storage space 24 into N partitions ESP1, ESP2, ... ESPN, and associates with each partition ESPi the replication rate TR equal to $n_i$, =1 to N, and where $n_1 < n_2 ... < n_N$.

Figure 3:
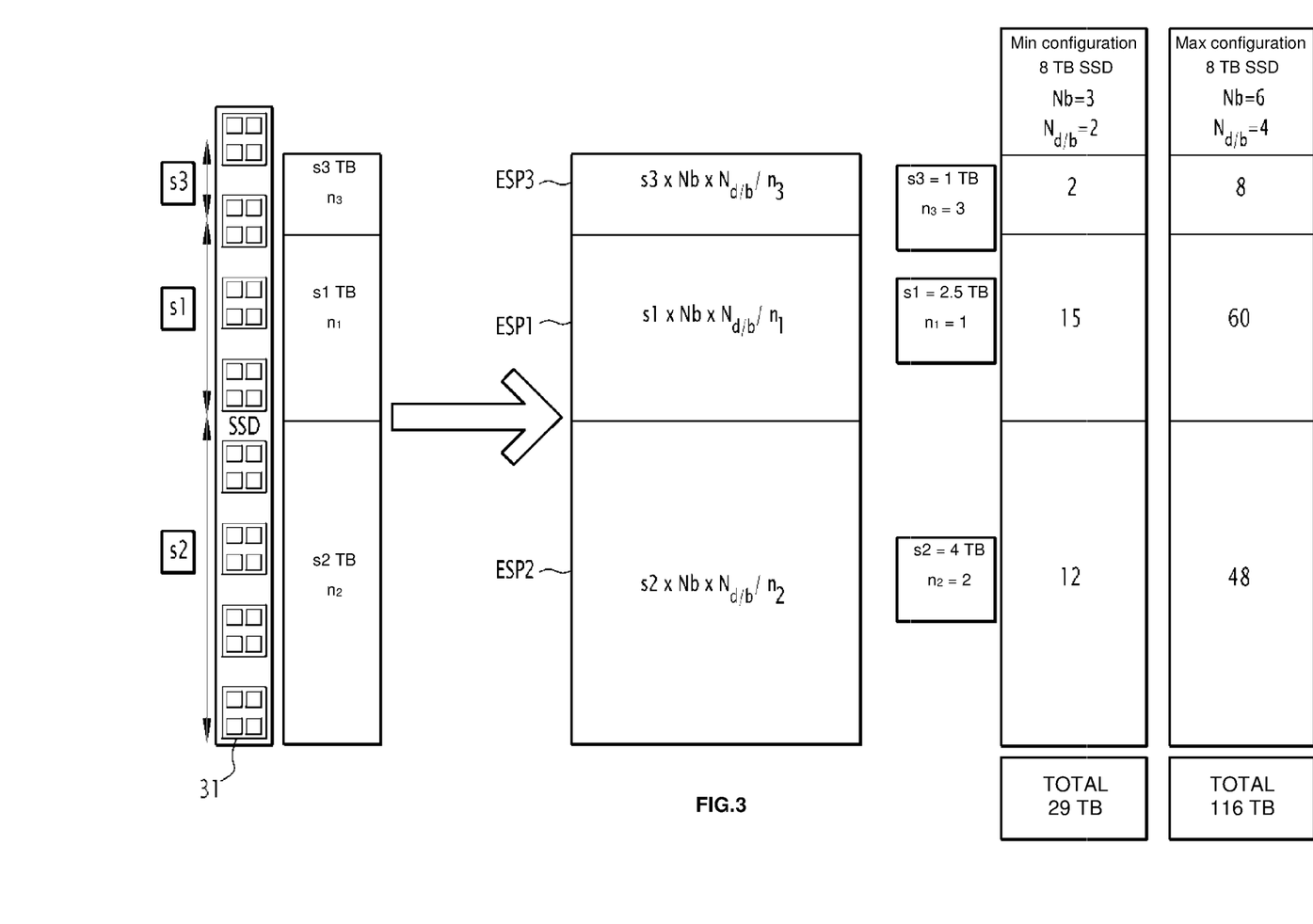
FIG. 3 is a representation of the partitioning of the storage memory space in a disk of the server and in the whole storage space, in one embodiment of the invention.

With reference to FIG. 3, we consider the particular case where there are 3 distinct replication rates (N=3), these replication rates being $n_1=1$, $n_2=2$, $n_3=3$. Each SSD 31 on each card B is partitioned into three volumes, a first volume of size s1, which is part of the ESP1 space associated with replication rate $n_1$, a second volume of size s2, which is part of the ESP2 space associated with replication rate $n_2$, and a third volume of size s3, which is part of the ESP3 space associated with replication rate $n_3$.

The useful volume available for each space ESPi, i=1 to 3, is therefore equal to $si \times Nb \times N_{d/b}/n_i$.

Thus, counting 8 TB per disk, of which 500 GB is reserved for the working memory for the application of the entertainment system, with s1=2.5 TB, s2=4 TB, s3=1 TB at least in our case (i.e. for a number of cards Nb equal to 3 and a number of disks per card $N_{d/b}$ equal to 2), we obtain a useful volume of 15 TB for ESP1, a useful volume of 12 TB for ESP2, 2 TB for ESP3, i.e. a total of 29 TB of useful volume in the storage space 24.

Counting 8 TB per disk, of which 500 GB is reserved for the working memory, again with s1=2.5 TB, s2=4 TB, s3=1 TB at most in our case (i.e. for a number of cards Nb equal to 6 and a number of disks per card $N_{d/b}$ equal to 4), we obtain a useful volume of 60 TB for ESP1, a useful volume of 48 TB for ESP2, 8 TB for ESP3, i.e. a total of 116 TB of useful volume in the storage space 24.

The invention therefore provides a larger useful storage volume than in the IFE servers of the prior art, in which a single replication rate is applied, equal to 2, so that a gross volume available between 48 and 196 TB gives a useful volume between 24 and 96 TB. This operation by partitioning allows the segregation of replication management processes, as well as those of updating and unified access to the media catalogue.

In the case of a lost SSD drive, the loss of useful content is at most 2.5 TB; in the case of a lost card B, the loss of useful content is between 5 (if there are 2 disks per card) and 10 TB (if there are 4 disks per card).

The combinatorial range of possible choices in terms of the number of partitions N, the value of the replication rate associated with each partition, and the size of the partition is almost infinite. The size of each partition allows a trade-off between loss resilience and maximum usable volume.

In a step 202 of updating the storage space 24, following the receipt by the server 20 of new content provided by the external electronic equipment 22 and/or in the context of updating the content already kept in the storage space, the storage control module 30 determines, according to predetermined control rules, which media content is to be deleted from the data storage space 24, optionally updates the replication rates of the content already stored, and determines the replication rates of the newly received content to be saved in the storage space 24.

Different rules for determining deletions and replication rates may be used by the storage control module 30; for example, a default replication rate is chosen for any new content received, with replication rates being updated over time, for example decreasing as the time stored in the storage space increases, or for example in the manner described later with reference to FIG. 5.

The storage control module 30 then provides to the interface module 32, for each item of media content, a command to delete all of the content, or, if the media content is to be kept in the storage space 24, a command to keep the content with the current value of the replication rate TR associated with it among $n_1$, $n_2$, ..., $n_N$.

In a step 203, the interface module 32 receives these commands, interfaces with the storage space 24 to implement them, deletes any copies of content determined as to-be-deleted; for any new content received with a replication rate TR equal to $n_i$, the interface module 32 stores $n_i$ copies of the new content in the partition ESPi; for any content that was already saved in the storage space 24 and whose replication rate has been changed to $n_j$, the interface module 32 stores $n_j$ copies of the content in the partition ESPj and deletes the copy or copies of said content stored in the partition, distinct from the partition ESPj, in which said copy or copies were stored.

In one embodiment, the interface module 32 further complies with the following constraints:
- only one item of media content must be stored in a single SSD, for content with a replication rate of 1; and/or
- as soon as the replication rate is greater than or equal to 2, copies of the same content must be stored in separate cards B.

Step 202 is implemented each time new media content is received by the server to be stored in the storage space and/or each time the overall content of the storage space 24 is updated. In one embodiment, step 201 is itself repeated, prior to step 202, when new replication rates for the stored content are determined or when it is decided to change the number N of such rates.

Distribution to the entertainment terminals by the distribution module 40 can then continue on the basis of this updated storage space 24.

Optionally, the invention further provides a solution for determining the content to be deleted from the storage space 24 and/or for determining the replication rates.

In such an embodiment, the storage control module 30 is configured to collect, for each item of media content considered in the storage space 24, the current value, known as AS, of the "audience score" indicator, which is representative of the number of views of the media content (to cover also the case of purely audio content for which the term views is inaccurate, we will speak hereafter of accesses).

The storage control module 30 is configured to collect, for each item of media content considered in the storage space 24, the current value, known as AS, of the "audience score" indicator, which is representative of the number of views of the media content (to cover also the case of purely audio content for which the term "views" is inaccurate, we will speak hereafter of accesses, "accesses" in which the content is viewed and/or listened to).

Optionally, the AS value is further weighted by the number of "like" and "dislike" ratings left by passengers (example: AS×number of "likes"/number of "dislikes)", or by a view duration ratio (e.g. the average time spent by passengers viewing the content divided by the total duration of the content).

AS can also be weighted by flight type (day/night), flight context (flight duration among short/medium/long haul), flight geography (departure airport, arrival airport), by seat class (business/economy/etc.).

In one embodiment, AS is weighted according to the aircraft's planned future routes (for the same criteria as described here for the aircraft's past routes).

In embodiments, the storage control module 30 is configured to determine, for each media content stored in the storage space 24, additionally the current value of the "decay rate" indicator, hereinafter referred to as DR indicator, proportional to the number of flight hours of the aircraft divided by the number of views of the content, i.e. DR=K. flight_hours/AS, with K being a constant that sets the value based on a nominal number of views over a certain time range.

The storage control module 30 is configured to determine, based on the calculated DR value, what will be the fate of the media content within the storage space 24, i.e. whether the content is to be deleted or retained and in the latter case, how many replications of the content are stored.

In one embodiment, the storage control module 30 is in particular adapted to implement the operations to be performed by it which are described below with reference to FIG. 5.

It will be further noted that when new media content is initially provided by the external equipment 22 via the communication link 66, it is assigned for example an initial default number of replications, and the interface module 32 is adapted to then interface with the storage space 24 to implement storage of the new media content with that initial default number of replications.

Figure 5:
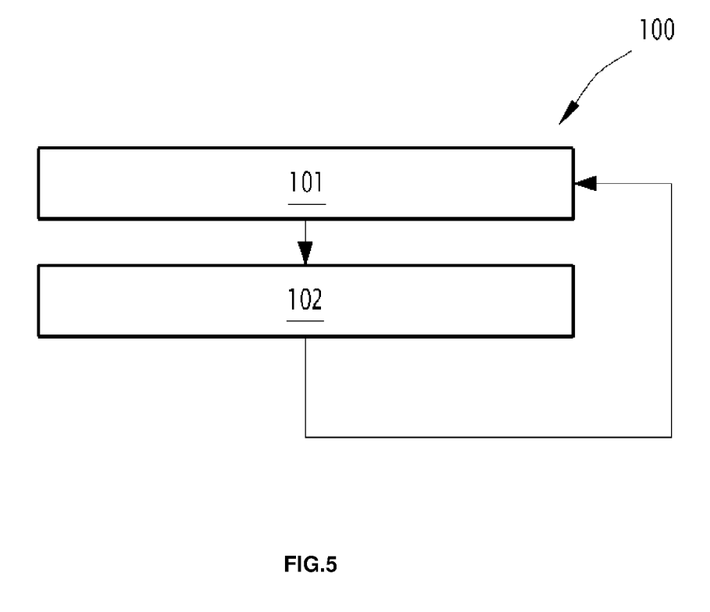
FIG. 5 is a flowchart of steps implemented in one embodiment of the invention.

The operation of the media server 20 in such an embodiment will now be explained, in particular with the aid of FIG. 5 showing a flowchart 100 of the storage control method according to the invention, the method being implemented by the media server 20.

A current state of the storage space 24 is considered, storing items of media content, each one associated with a respective replication rate, for example here equal to $n_1$, $n_2$ or $n_3$, where $n_1 < n_2 < n_3$, in this case $n_1 = 1$, $n_2 = 2$ and $n_3 = 3$ (of course, there may be any number N greater than 2 of distinct replication values considered).

These items of content were initially provided by the external electronic equipment 22, then stored in the storage space 24 and are distributed by the distribution module 40 to the user terminals, where the passengers can then consult that content. The logs of the perusal of the content by the passengers, indicating in particular the content perused, the date and duration of perusal, and optionally an index of the passenger's satisfaction following their perusal of the content, are collected by the terminals and then routed (possibly after agglomeration and processing to determine the indicators) via the local area network to the storage control module 30 which collects them.

The set of steps 100 is for example implemented regularly for each partition ESPi, for example, every period T or else at each provision of new content during step 202, considering successively each partition ESPi, in decreasing order of associated replication rates, i.e. in the present case, first ESP3, then ESP2, then ESP1.

In one embodiment, the new media content to be stored in the storage space 24 are associated with a predefined initial number of replications from among $n_1$, $n_2$ or $n_3$, which will not be changed before a predetermined time (e.g. until the next period T) by the process described below implemented by the storage control module 30.

Considering the partition ESPi, in an initial step 101, the storage control module 30 first places the media content stored in ESPi identified as to-be-deleted, if any, in a list Li of content to be deleted.

Then, the storage control module 30 determines whether the ESPi partition, after the contents identified in the list Li has been deleted, has available space to accommodate the new content to be stored with the predefined replication value $n_i$.

If it does, the storage control module 30 transmits to the interface module 32 the deletion commands corresponding to the list Li and the storage commands for this new content with the predefined replication value $n_i$, and then repeats the set of steps 100 considering this time the partition ESPi−1 (if i≠1).

If not, in a step 102, the storage control module 30 collects for each item of stored media content associated with the replication value $n_i$ and not identified as to be deleted, the current AS value and then calculates the current value of the indicator DR as a function of that AS value, and then sequentially orders this content by its current DR value.

Then, considering each of these items of content one after another, starting from the one with the highest DR, the storage control module 30 updates the number of replications associated with it by replacing the number $n_i$ of replications associated with said content with the next-highest number of replications, i.e. $n_{i-1}$, if i≠1. When i=1, the update consists of adding the content in question to the list L1 of content then stored in the ESP1 partition that is to be deleted.

After each update, the storage control module 30 determines whether the available space thus freed up in the partition ESPi allows the new content to be stored with the replication value $n_i$, and if not repeats the process, looking at the content with the next-highest DR, until the space freed up allows these new items of content to be stored in the partition ESPi.

Then, the storage control module 30 transmits to the interface module 32 the deletion commands corresponding to the list Li, the commands to store the new content with the predefined replication value $n_i$ and the commands to store in ESPi−1 the content already stored in the storage space 24 but whose replication rate has been updated to $n_{i-1}$.

Next, the same steps are implemented this time for the ESPi−1 partition, if i≠1.

The set of steps 100 therefore implements comparative logic processing from which the new items of content to be stored are excluded.

Step 203 is then implemented with the updates thus determined, i.e. the set of media content to be deleted from the partitions ESPi, i=1 to N, as indicated respectively in the lists Li, the new content associated with a replication rate ni to be stored in the partition ESPi and the content already stored in the storage space 24 but whose replication rate has been updated during the implementation of the N iterations of the set of steps 100, successively applied to ESPN, . . . ESP1.

The more passengers have had access to a content, the higher the replication rate of the resulting content; for each given period of time without the content being seen, the replication rate of the resulting content is greatly reduced; the available storage space and the number of replications so far stored are also taken into account.

In a so-called autonomous embodiment, the current indicator(s) values collected are specific to the aircraft 16 and to the use of the media server 20 within that aircraft.

In the described embodiment, free space was released in a partition if the space was determined to be insufficient; in other embodiments, a process of releasing free space within a partition is initiated by comparing DR indicators of the content with each other even before insufficient free space is detected.

In another semi-autonomous embodiment, the AS indicator slaves the audience score specific to the aircraft 16 to a score consolidated by an external authority and supplied to the storage control module 30 (this score could be consolidated by a company at the level of its fleet of aircraft, for example, or refined on a route regardless of the aircraft flying the route). This semi-autonomous embodiment also makes it possible, in one embodiment, to automatically force the value of the DR indicator in order to automatically delete a given item of content (end of licence, editorial choice, etc.), to cancel it for contractual reasons or, on the contrary, to give it priority. The content stored on the server is therefore updated regularly and automatically;

the deletion or continued storage of each item of content in question is determined automatically in some embodiments, as well as the number of replications stored; the use of the bandwidth required for these operations is minimised and controlled, as are the updates to the stored content.

The invention has been described above with reference to a server in an on-board entertainment system; it is of course applicable to a server in any other system, on-board or not, and in any field other than that of passenger entertainment.

The invention claimed is:

1. A method of storing data in a data storage space of a server, comprising steps implemented by an electronic storage space management module:
    partitioning the storage space into a plurality of distinct partitions;
    receiving a set of data to be stored and storing said set of data in one of said partitions;
    wherein the method further comprises the following steps:
        a number, called a number of replications, is associated with each partition; distinct numbers of replications being associated with distinct partitions;
        a number of replications n of said received data set having been defined for said data set, n having any value from among said numbers of replications associated with the partitions, selecting a partition with which said defined number n of replications has been associated, storing said data set comprising the storing of n replications of said data set in said selected partition,
    wherein the method further comprises the steps to free up space in a partition associated with a number of replications:
        a. calculating a current value of a preservation parameter for each of a plurality of data sets for which a same number of replications has been defined, equal to said number of replications associated with said partition; the preservation parameter representing a time divided by a number of accesses to media content included in the data set during said time;
        b. selecting at least one data set to be deleted from said partition based on a comparison of the current values of the preservation parameters of each of the data sets.

2. The method of storing data according to claim 1, wherein the storage space is distributed over a plurality of electronic storage units and wherein if the number n of replications of said received set is greater than 2, the storage of said data set is implemented by the electronic storage space management module under a following condition: distinct replications of said data set are stored, in said selected partition, on distinct units, said units being cards or disks of a same card.

3. The method of storing data according to claim 1, wherein the partitioning is updated, comprising changing sizes of the partitions assigned to numbers of replications, according to the data sets to be stored.

4. The method of storing data according to claim 1, wherein said server is a media server for an on-board entertainment system comprising entertainment user terminals for a passenger transport vehicle, said media server being configured to be carried on board said vehicle and to be connected to at least one on-board entertainment user terminal via an on-board local area network, the media server comprising:
    said storage space, the data sets comprising media content;
    a distribution module configured to distribute, via the on-board local area network, to at least one user terminal at least one item of media content stored in the storage space.

5. The method of storing data according to claim 1, wherein step b further comprises a step of updating the number of replications defined for said data set to be deleted, said updated number being set as equal to a number of replications associated with one of said partitions and strictly lower than a first number.

6. The method of storing data according to claim 1, wherein steps a and b are implemented successively for each of the partitions, starting with the partition associated with a largest number of replications and continuing in descending order of said numbers of replications associated with the partitions.

7. The method of storing data according to claim 1, wherein the preservation parameter is a function of a parameter K multiplied by a number of flight hours divided by the number of accesses to the media content during the number of flight hours.

8. A device for managing a data storage space of a server, said device being adapted to partition the storage space into a plurality of distinct partitions, to receive a data set to be stored and to store said data set in one of said partitions;
 wherein the device is adapted to associate a number, called a number of replications, with each partition, distinct numbers of replications being associated with distinct partitions;
  said device being adapted to, a number of replications n of said received data set having been defined for said data set, n having any value from among said numbers of replications associated with the partitions, select a partition with which said defined number n of replications has been associated, and to store n replications of said data set in said selected partition,
  said device being adapted to calculate a current value of a preservation parameter for each of a plurality of data sets for which a same number of replications has been defined, equal to said number of replications associated with said partition; the preservation parameter representing a time divided by a number of accesses to media content included in the data set during said time, select at least one data set to be deleted from said partition based on a comparison of the current values of the preservation parameters of each of the data sets.

9. The server according to claim 8, said server being a media server for an on-board entertainment system comprising entertainment user terminals for a passenger transport vehicle, said media server being configured to be carried on board said vehicle and to be connected to at least one on-board entertainment user terminal via an on-board local area network, the media server comprising:
 said storage space, the data sets comprising media content;
 a distribution module configured to distribute, via the on-board local area network, to at least one user terminal at least one item of media content stored in the storage space.

10. A server comprising a data storage space and a device for managing said data storage space, said device being adapted to partition the storage space into a plurality of distinct partitions, to receive a data set to be stored and to store said data set in one of said partitions;
 wherein the device is adapted to associate a number, called a number of replications, with each partition, distinct numbers of replications being associated with distinct partitions; said device being adapted to, a number of replications n of said received data set having been defined for said data set, n having any value from among said numbers of replications associated with the partitions, select a partition with which said defined number n of replications has been associated, and to store n replications of said data set in said selected partition,
 wherein said device is adapted to calculate a current value of a preservation parameter for each of a plurality of data sets for which a same number of replications has been defined, equal to said number of replications associated with said partition; the preservation parameter representing a time divided by a number of accesses to media content included in the data set during said time, select at least one data set to be deleted from said partition based on a comparison of the current values of the preservation parameters of each of the data sets.

* * * * *